(12) United States Patent
Nedjar et al.

(10) Patent No.: US 10,705,202 B2
(45) Date of Patent: Jul. 7, 2020

(54) ITERATIVE APPROACH TO ACHIEVE ANGULAR AMBIGUITY RESOLUTION

(71) Applicant: GM Global Technology Operations LLC, Detroit, MI (US)

(72) Inventors: Shmuel Nedjar, Modiin (IL); Igal Bilik, Rehovot (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 618 days.

(21) Appl. No.: 15/409,986

(22) Filed: Jan. 19, 2017

(65) Prior Publication Data

US 2018/0203108 A1 Jul. 19, 2018

(51) Int. Cl.
*G01S 13/90* (2006.01)
*G01S 13/931* (2020.01)

(52) U.S. Cl.
CPC ............ *G01S 13/90* (2013.01); *G01S 13/904* (2019.05); *G01S 13/931* (2013.01)

(58) Field of Classification Search
CPC ..... G01S 13/90; G01S 13/9035; G01S 13/931
USPC ...................................................... 342/25 A
See application file for complete search history.

(56) References Cited

U.S. PATENT DOCUMENTS

| | | | | |
|---|---|---|---|---|
| 2,577,785 A | * | 12/1951 | Lyon | F41G 3/06 235/405 |
| 2,718,355 A | * | 9/1955 | Hammond, Jr. | F41G 5/14 235/405 |
| 3,075,190 A | * | 1/1963 | Laporte | G01S 1/02 342/146 |
| 3,438,033 A | * | 4/1969 | Preston | G01S 13/50 342/113 |
| 3,513,707 A | * | 5/1970 | Russell | G06G 7/48 473/152 |
| 3,903,525 A | * | 9/1975 | Mullins | G01S 13/5242 342/161 |
| 3,935,572 A | * | 1/1976 | Broniwitz | G01S 13/4472 342/80 |
| 3,952,302 A | * | 4/1976 | Mullins | G01S 13/5242 342/161 |
| 4,321,601 A | * | 3/1982 | Richman | G01S 13/9023 342/25 C |

(Continued)

*Primary Examiner* — Vladimir Magloire
*Assistant Examiner* — Nuzhat Pervin
(74) *Attorney, Agent, or Firm* — Cantor Colburn LLP

(57) ABSTRACT

A system and method to achieve angular ambiguity resolution in a two-dimensional Doppler synthetic aperture radar system include transmitting pulses using a plurality of transmit elements during movement of a platform on which the system is mounted. Reflections are received from a target resulting from the pulses and the reflections are processed to determine a Doppler measurement. The processing includes isolating movement of the target in the Doppler measurement, and determining a target azimuth angle and a target elevation angle to the target based on an iterative process that includes estimating the target elevation angle or the target azimuth angle and then determining the target azimuth angle or the target elevation angle, respectively, based on a beamforming matrix. The beamforming matrix indicates amplitude and phase at each azimuth angle and each elevation angle among a set of azimuth angles and a set of elevation angles.

12 Claims, 3 Drawing Sheets

(56) References Cited

U.S. PATENT DOCUMENTS

| | | | | |
|---|---|---|---|---|
| 4,546,354 A * | 10/1985 | Boles | G01S 13/9023 | 342/179 |
| 5,103,233 A * | 4/1992 | Gallagher | G01S 13/22 | 342/408 |
| 5,115,243 A * | 5/1992 | Perry | G01S 7/282 | 342/137 |
| 5,115,244 A * | 5/1992 | Freedman | G01S 13/22 | 342/137 |
| 5,128,683 A * | 7/1992 | Freedman | G01S 7/032 | 342/158 |
| 5,172,118 A * | 12/1992 | Peregrim | G01S 7/36 | 342/191 |
| 5,173,706 A * | 12/1992 | Urkowitz | G01S 7/032 | 342/101 |
| 5,245,347 A * | 9/1993 | Bonta | G01S 7/2813 | 342/149 |
| 5,424,742 A * | 6/1995 | Long | G01C 21/005 | 342/25 C |
| 5,430,445 A * | 7/1995 | Peregrim | F41G 7/343 | 342/25 C |
| 5,774,087 A * | 6/1998 | Rose | G01S 3/52 | 342/113 |
| 6,404,379 B1 * | 6/2002 | Yu | G01S 13/44 | 342/147 |
| 6,628,844 B1 * | 9/2003 | Benitz | G01S 13/9011 | 382/276 |
| 6,801,156 B1 * | 10/2004 | Wasiewicz | G01S 7/4052 | 342/140 |
| 7,479,920 B2 * | 1/2009 | Niv | G01S 13/50 | 342/65 |
| 7,522,097 B2 * | 4/2009 | Wakeman | G01S 7/4026 | 342/13 |
| 7,633,429 B1 * | 12/2009 | Liu | G01S 13/935 | 342/33 |
| 7,944,390 B2 * | 5/2011 | Krieger | G01S 13/904 | 342/25 F |
| 8,299,958 B2 * | 10/2012 | Kemkemian | G01S 13/72 | 342/107 |
| 8,456,349 B1 * | 6/2013 | Piesinger | G01S 13/46 | 342/133 |
| 2003/0048214 A1 * | 3/2003 | Yu | G01S 7/2813 | 342/16 |
| 2003/0174088 A1 * | 9/2003 | Dizaji | G01S 7/2927 | 342/93 |
| 2004/0178943 A1 * | 9/2004 | Niv | G01S 13/50 | 342/29 |
| 2004/0178951 A1 * | 9/2004 | Ponsford | G01S 3/74 | 342/192 |
| 2005/0184987 A1 * | 8/2005 | Vincent | G06T 15/06 | 345/421 |
| 2005/0242985 A1 * | 11/2005 | Ponsford | G01S 7/36 | 342/59 |
| 2008/0117098 A1 * | 5/2008 | Johnson | G01S 7/062 | 342/25 F |
| 2009/0109086 A1 * | 4/2009 | Krieger | G01S 13/904 | 342/25 F |
| 2011/0140952 A1 * | 6/2011 | Kemkemian | G01S 13/933 | 342/146 |
| 2013/0176161 A1 * | 7/2013 | Derham | G01S 13/04 | 342/27 |
| 2015/0369912 A1 * | 12/2015 | Kishigami | G01S 13/26 | 342/113 |
| 2016/0025849 A1 * | 1/2016 | Wang | G01S 7/023 | 342/59 |
| 2016/0139254 A1 * | 5/2016 | Wittenberg | G01S 7/354 | 342/27 |
| 2017/0098891 A1 * | 4/2017 | Nishimoto | G01S 3/46 | |

* cited by examiner

US 10,705,202 B2

ITERATIVE APPROACH TO ACHIEVE ANGULAR AMBIGUITY RESOLUTION

INTRODUCTION

The subject invention relates to an iterative approach to achieve angular ambiguity resolution.

A synthetic aperture radar (SAR) is a radar that uses the motion of the antenna to improve spatial resolution. The distance that the SAR travels in the time it takes for reflections to return to the antenna based on transmitted pulses creates a synthetic antenna aperture that is larger than the actual antenna size. Increased antenna aperture improves image resolution of the two- or three-dimensional image obtained with the SAR. A beamforming antenna transmits the pulses at a selected angle. When the velocity at which the SAR is moving is known, the Doppler frequency of static objects determines their angle with respect to the direction of travel of the SAR, but Doppler SAR in two dimensions, azimuth and elevation, suffers from angular ambiguity. Accordingly, it is desirable to provide a SAR that achieves angular ambiguity resolution.

SUMMARY

In one exemplary embodiment, a method of achieving angular ambiguity resolution in a two-dimensional Doppler synthetic aperture radar system includes transmitting pulses using a plurality of transmit elements during movement of a platform on which the system is mounted, receiving reflections from a target resulting from the pulses, and processing the reflections to determine a Doppler measurement, the processing including subtracting a component specific to the movement of the platform to isolate movement of the target in the Doppler measurement. Determining a target azimuth angle and a target elevation angle to the target is based on an iterative process that includes estimating the target elevation angle or the target azimuth angle and then determining the target azimuth angle or the target elevation angle, respectively, based on a beamforming matrix. The beamforming matrix indicates amplitude and phase at each azimuth angle and each elevation angle among a set of azimuth angles and a set of elevation angles.

In another exemplary embodiment, a system to achieve angular ambiguity resolution using includes a platform to move, a two-dimensional Doppler synthetic aperture radar mounted on the platform to transmit pulses and receive reflections resulting from the pulses, and a memory to store a beamforming matrix. The beamforming matrix indicates amplitude and phase at each azimuth angle and each elevation angle among a set of azimuth angles and a set of elevation angles. The system also includes a processor to obtain a Doppler measurement specific to a target and determine a target azimuth angle and a target elevation angle to the target based on an iterative process that includes estimating the target elevation angle or the target azimuth angle and then determining the target azimuth angle or the target elevation angle, respectively, based on the beamforming matrix.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
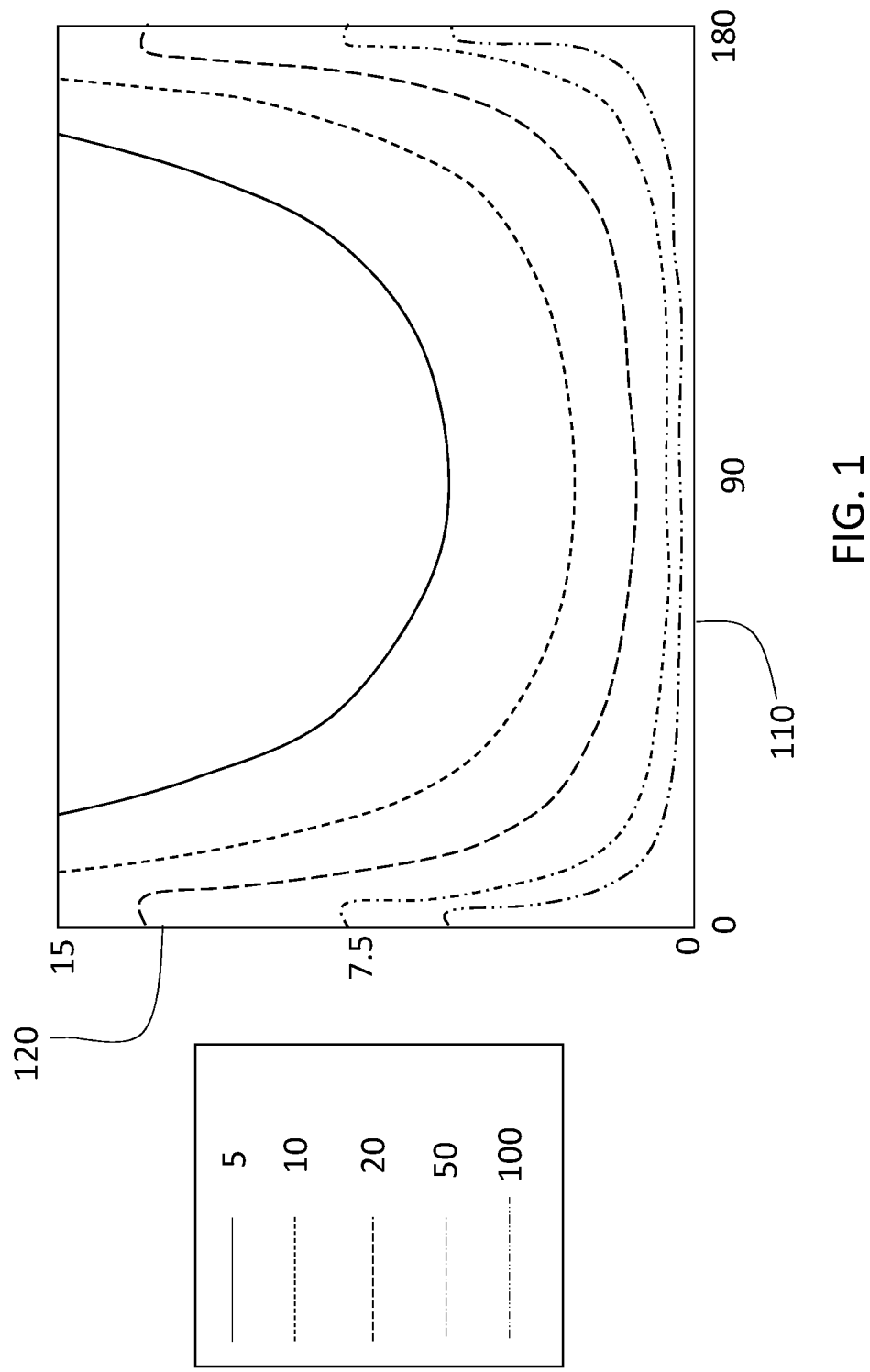
FIG. 1 shows the angle resolution resulting for a platform of a radar system according to one or more embodiments at different speeds.

The following description is merely exemplary in nature and is not intended to limit the present disclosure, its application or uses. It should be understood that throughout the drawings, corresponding reference numerals indicate like or corresponding parts and features.

As previously noted, angular ambiguity in azimuth and elevation is an issue associated with Dopper SAR systems. While SAR was traditionally used in aircraft and spaceborne vehicles, it is increasing used in terrestrial vehicles such as automobiles, for example. As previously indicated, the moving platform on which the radar system is mounted forms a larger synthetic aperture with enhanced angle resolution as compared with the dimensions of the real antenna array. The narrow beam capability of a SAR radar system facilitates multi-target discrimination and imaging. While the synthetic array length increases linearly with the speed of the platform on which the radar system is mounted, the beam resolution or angular resolution decreases exponentially with platform speed.

One or more embodiments of the systems and methods detailed herein relate to iteratively resolving ambiguity in angular resolution of the two-dimensional Doppler SAR based on a beamforming matrix. The beamforming matrix is a data structure such as a table, for example, that indicates the response in phase and amplitude of the reflection coming from each direction of arrival at each array element. Beamforming alone represents an inefficient solution to angular resolution because its performance is determined solely by array aperture. However, according to one or more embodiments, an elevation estimate is refined using the beamforming matrix to determine both elevation and azimuth of the target.

FIG. 1 shows the angle resolution resulting for a platform of a radar system according to one or more embodiments at different speeds. The axis 110 indicates look angle in degrees from the platform, and the axis 120 indicates angle resolution in degrees associated with each look angle. Five different curves are shown for five different speeds of the platform on which the radar system is mounted. The speed is in kilometers/hour. As FIG. 1 indicates, the angular resolution is lowest, for any speed, at a look angle of 90 degrees. Angular resolution decreases progressively with increasing platform speed. As such, the lowest angular resolution shown in FIG. 1 for any look angle is associated with the highest platform speed shown, 100 kilometers/hour. The Doppler measurement is a function of:

$$v\cos\theta \qquad \text{[FN. 1]}$$

In FN. 1, v is the velocity of the platform on which the radar system is mounted, and $\theta$ is the look angle. As FN. 1 indicates, the look angle $\theta$ can be determined from the Doppler measurement in this case of a one-dimensional angle.

In the two-dimensional case of the SAR, the radar system measures the projection of the static target velocity relative to the platform. The resulting one dimensional projection vector of target velocity must be resolved in azimuth and elevation. That is, the Doppler measurement is a function of:

$$v \cos(\theta) \cos(\varphi) \quad [FN. 2]$$

In FN. 2, $\theta$ is the look angle in azimuth, and $\varphi$ is the look angle in elevation. While determining the one-dimensional look angle based on the Doppler measurement according to FN. 1 is straight-forward, resolving the ambiguity between the azimuth and elevation contributions of the look angle, according to FN. 2, is more challenging. Embodiments of the systems and methods detailed herein relate to iteratively resolving the angular ambiguity in a moving-platform based radar system that is a two-dimensional Doppler SAR.

Figure 2:
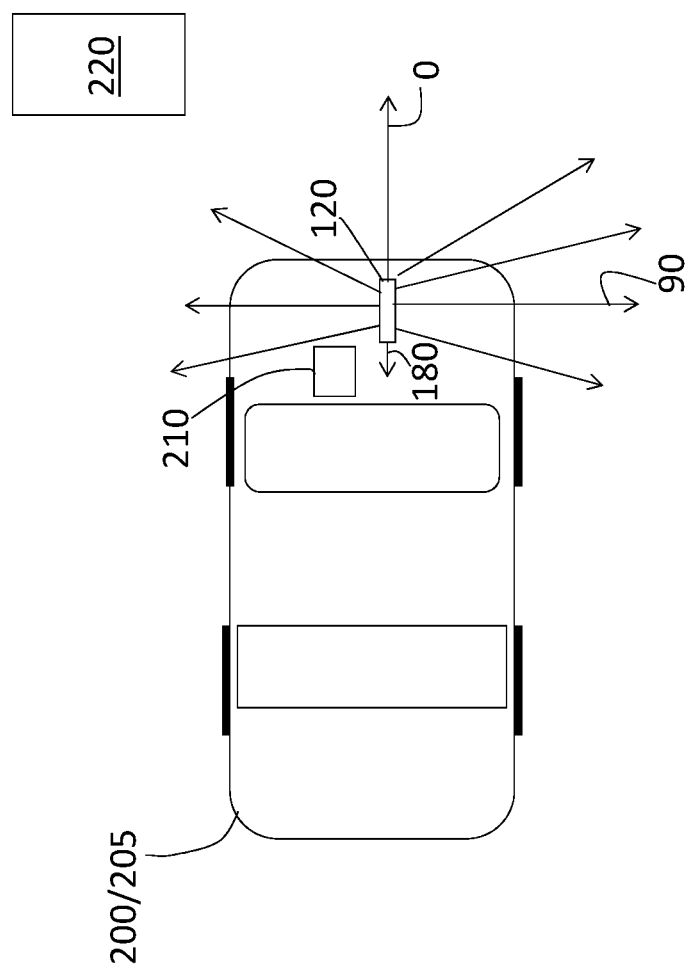
FIG. 2 is a schematic diagram of a radar system according to one or more embodiments.

FIG. 2 is a schematic diagram of a radar system 120 according to one or more embodiments. The radar system 120 is a Doppler SAR that obtains velocity, range, and two-dimensional look angle (azimuth and elevation) to a target 220. The radar system 120 is mounted on a platform 200 that is an automobile 205 in the example shown in FIG. 2. In alternate embodiments, the platform 200 can be another type of vehicle (e.g., construction vehicle, farm vehicle) or equipment in an automated factory, for example. The platform 200 can be any moving support for the radar system 120.

As indicated, the transmissions by the radar system 120 have look angles from 0 to 180 degrees on each side of the automobile 205. A controller 210 can be coupled to the radar system. The controller 210 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. In addition to partially or fully processing the signals received by the radar system 120, the controller 210 can be involved in other systems of the automobile 205 such as the collision avoidance, automatic braking, and automated driving systems.

The radar system 120 includes known components such as a transmit portion, a receive portion and antennas that are either dedicated to transmission or reception or function in a transceiver configuration. The radar system 120 can be a multi-input multi-output (MIMO) radar with multiple transmit elements and multiple receive elements or, in an alternate embodiment, can have multiple transmit elements and a single receive element. Each receive element receives reflections resulting from transmission by every transmit element. The size of the beamforming matrix is a function of the field of view and resolution in azimuth and elevation. For example, if the MIMO radar array is such that the field of view in both azimuth and elevation is −10 degrees to 10 degrees with a 1 degree resolution, and there are 12 elements that receive reflections, then the beamforming matrix is a 441-by-12 array with complex values that indicate phase and amplitude. This is because there are 21 discrete angle values in each of azimuth and elevation (21*21=441). The beamforming matrix can be stored by the controller 210, for example.

Figure 3:
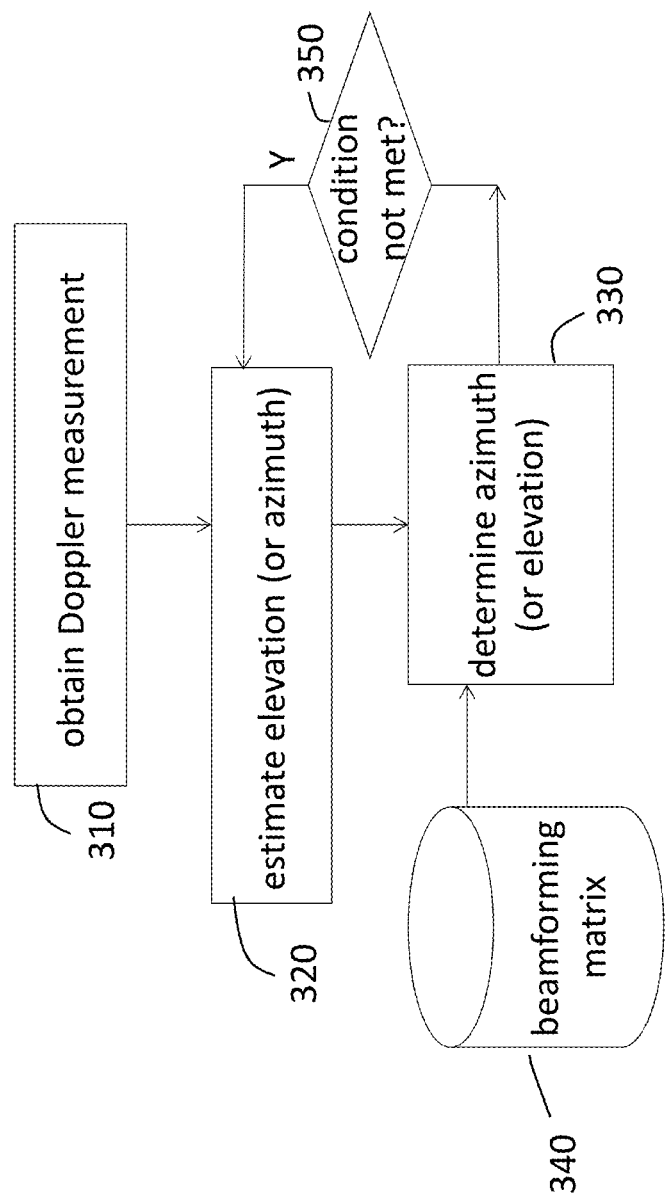
FIG. 3 is a process flow of a method of resolving angular ambiguity in azimuth and elevation according to one or more embodiments.

FIG. 3 is a process flow of a method of resolving angular ambiguity of a target 220 in azimuth and elevation according to one or more embodiments. At block 310, obtaining a Doppler measurement includes obtaining a measurement that corresponds with FN. 2. Obtaining the Doppler measurement also includes isolating the Doppler measurement resulting from movement of the target 220 by subtracting the contribution from movement of the platform 200. In the case of the platform 200 being an automobile 205, the odometer, controller 210, or a combination of components can provide information about the platform 200 movement, and the controller 210 or other processor can obtain the Doppler measurement that is specific to the movement of the target 220. At block 320, estimating an elevation angle is done under the assumption that there is no azimuthal contribution to the Doppler measurement initially. That is, FN. 2 is used with the Doppler measurement (obtained at block 310) and $\theta=0$ to determine $\varphi$. Initially, this elevation angle value represents a coarse estimate that is then refined by using the beamforming matrix.

At block 330, the azimuth angle ($\theta$) is determined. To determine the azimuth angle, the beamforming matrix, which can be stored in a database 340, for example, is searched. As previously noted, the database 340 can be part of the controller 210. Specifically, the azimuth angle corresponding with the maximum amplitude in the beamforming matrix for the elevation angle (estimated at block 320) is found. Once the azimuth angle is determined, FN. 2 can be used to refine the elevation estimate (at block 320). As FIG. 3 indicates, these processes of estimating elevation angle (at block 320) and finding azimuth angle according to the beamforming matrix (at block 330) are repeated iteratively.

The iterative process can stop based on different conditions that are checked at block 350. According to an exemplary embodiment, the check at block 350 can be a threshold change in angles between two consecutive iterations can be used as a condition to stop the iterations (e.g., angles did not change by more than 0.5 degrees from the last iteration). According to another embodiment, the iterations can continue until there is no improvement in the amplitude value associated with the latest elevation angle and azimuth angle. While the exemplary embodiment discussed for explanatory purposes relates to estimating an elevation angle (at block 320) and iteratively determining the azimuthal component, the azimuth angle can instead be estimated (at block 320), and the elevation angle can be determined (at block 330) based on the beamforming matrix. The angle determination that is based on the beamforming matrix (at block 330) can be more accurate than the estimate based on FN. 2 (at block 320). Thus, the specific embodiment that is used to determine elevation angle and azimuth angle can be selected based on which angle is deemed to be more critical.

The processes discussed with reference to FIG. 3 can be extended for multiple targets 220. That is, the processes can be repeated for each target 220. According to an exemplary embodiment, the elevation angle and azimuth angle can be estimated, using the processes discussed with reference to FIG. 3, for the target 220 that results in the strongest reflections (highest amplitude values) first, and angles to additional targets 220 can be determined in order of highest to lowest amplitude of the reflections.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of achieving angular ambiguity resolution in a two-dimensional Doppler synthetic aperture radar system, the method comprising:

transmitting pulses using a plurality of transmit elements during movement of a platform on which the system is mounted;

receiving reflections from a target resulting from the pulses;

processing the reflections to determine a Doppler measurement, the processing including subtracting a component specific to the movement of the platform to isolate movement of the target in the Doppler measurement; and determining a target azimuth angle and a target elevation angle to the target based on an iterative process that includes estimating the target elevation angle or the target azimuth angle and then determining the target azimuth angle or the target elevation angle, respectively, based on a beamforming matrix, wherein the beamforming matrix indicates amplitude and phase at each azimuth angle and each elevation angle among a set of azimuth angles and a set of elevation angles.

2. The method according to claim 1, wherein the estimating the target elevation angle or the target azimuth angle is based on an equation for the Doppler measurement being given by, $$v \cos(\theta) \cos(\varphi),$$

v is velocity of the platform, $\theta$ is the target azimuth angle, and $\varphi$ is the target elevation angle.

3. The method according to claim 2, wherein the estimating the target elevation angle or the target azimuth angle for a first iteration includes computing the target elevation angle or the target azimuth angle based on setting, respectively, the target azimuth angle or the target elevation angle equal to zero in the equation for the Doppler measurement.

4. The method according to claim 2, wherein the estimating the target elevation angle or the target azimuth angle for a second or subsequent iteration includes computing the target elevation angle or the target azimuth angle based on the equation for the Doppler measurement and, respectively, the target azimuth angle or the target elevation angle determined based on the beamforming matrix.

5. The method according to claim 1, wherein the determining the target azimuth angle based on the beamforming matrix includes finding the azimuth angle among the set of azimuth angles corresponding with a maximum amplitude for a respective elevation angle being the target elevation angle.

6. The method according to claim 1, wherein the determining the target elevation angle based on the beamforming matrix includes finding the elevation angle among the set of elevation angles corresponding with a maximum amplitude for a respective azimuth angle being the target azimuth angle.

7. A system to achieve angular ambiguity resolution using, the system comprising:
a platform configured to move;
a two-dimensional Doppler synthetic aperture radar mounted on the platform and configured to transmit pulses and receive reflections resulting from the pulses;
a memory to store a beamforming matrix, wherein the beamforming matrix indicates amplitude and phase at each azimuth angle and each elevation angle among a set of azimuth angles and a set of elevation angles; and
a processor configured to obtain a Doppler measurement specific to a target and determine a target azimuth angle and a target elevation angle to the target based on an iterative process that includes estimating the target elevation angle or the target azimuth angle and then determining the target azimuth angle or the target elevation angle, respectively, based on the beamforming matrix.

8. The system according to claim 7, wherein the processor estimates the target elevation angle or the target azimuth angle based on an equation for the Doppler measurement being given by, $$v \cos(\theta) \cos(\varphi),$$

v is velocity of the platform, $\theta$ is the target azimuth angle, and $\varphi$ is the target elevation angle.

9. The system according to claim 8, wherein the processor estimates the target elevation angle or the target azimuth angle for a first iteration by computing the target elevation angle or the target azimuth angle based on setting, respectively, the target azimuth angle or the target elevation angle equal to zero in the equation for the Doppler measurement.

10. The system according to claim 8, wherein the processor estimates the target elevation angle or the target azimuth angle for a second or subsequent iteration by computing the target elevation angle or the target azimuth angle based on the equation for the Doppler measurement and, respectively, the target azimuth angle or the target elevation angle determined based on the beamforming matrix.

11. The system according to claim 7, wherein the processor determines the target azimuth angle based on the beamforming matrix by finding the azimuth angle among the set of azimuth angles corresponding with a maximum amplitude for a respective elevation angle being the target elevation angle.

12. The system according to claim 7, wherein the processor determines the target elevation angle based on the beamforming matrix by finding the elevation angle among the set of elevation angles corresponding with a maximum amplitude for a respective azimuth angle being the target azimuth angle.

* * * * *